United States Patent
Klesper et al.

(10) Patent No.: US 7,742,578 B1
(45) Date of Patent: Jun. 22, 2010

(54) LOCATION DETERMINATION CAPABILITIES FOR EMERGENCY CALL SERVICES

(75) Inventors: Stevan Klesper, Gardner, KS (US); Stephen Williams, Olathe, KS (US); Kevin McGinnis, Overland Park, KS (US); Arun Santharam, Overland Park, KS (US); Dan Durig, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1141 days.

(21) Appl. No.: 11/369,055

(22) Filed: Mar. 6, 2006

(51) Int. Cl.
*H04N 7/14* (2006.01)

(52) U.S. Cl. .......................... 379/45; 370/352

(58) Field of Classification Search .................. 379/45; 370/352
See application file for complete search history.

(56) References Cited

U.S. PATENT DOCUMENTS

| | | | |
|---|---|---|---|
| 2005/0213716 A1* | 9/2005 | Zhu et al. ..................... | 379/45 |
| 2006/0018305 A1 | 1/2006 | Cope | |
| 2006/0056388 A1* | 3/2006 | Livingood ................... | 370/352 |
| 2006/0072549 A1* | 4/2006 | Goldman et al. ............ | 370/352 |
| 2006/0120517 A1* | 6/2006 | Moon et al. ................... | 379/45 |

* cited by examiner

*Primary Examiner*—Curtis Kuntz
*Assistant Examiner*—Maria El-Zoobi

(57) ABSTRACT

A communication system comprising an access system configured to provide a plurality of end devices with access to a packet communication network, a first end device of the plurality of end devices configured to transmit a first query to the access system, receive a first response indicating a first identifier for the access system, transmit a registration message indicating the first identifier and a second identifier for the first end device, and transmit a first call request for a call wherein the first call request indicates the second identifier, and a call processing system in communication with the first end device and configured to receive the registration message, store the first identifier in association with the second identifier, receive the first call request, process the second identifier to determine the first identifier stored in association with the second identifier, and transmit a second call request indicating the first identifier.

20 Claims, 8 Drawing Sheets

LOCATION DETERMINATION CAPABILITIES FOR EMERGENCY CALL SERVICES

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to emergency call service capabilities, and in particular, to determining the location of callers obtaining emergency call services.

2. Description of the Prior Art

Emergency service call handling capabilities are offered by most telecommunication service providers. For example, users of plain old telephone service (POTS) are typically accustomed to dialing 911 for emergency service. In addition to connecting the user to a public service answering point (PSAP), emergency service call handling capabilities include additional capabilities, such as determining the location of a caller.

Recent advances in telecommunication technologies have made the task of determining the location of a caller more difficult than in the past. In past circuit switched networks, the location of a caller could be easily determined by performing a database look-up to a table holding the calling number stored in association with a physical address. In contrast, new types of voice service technologies do not always associate calling numbers with physical addresses. For example, voice over Internet protocol (VoIP) service users are able to roam wherever there is adequate Internet access. As a result, the location of VoIP callers cannot be reliably determined.

In one prior art solution to the problem of determining the location of VoIP callers, a static relationship is assumed between the calling number and the physical location of the caller. However, this solution only suffices in cases where users are not able to port their phones to new locations.

In another prior art solution, a central server system in a local area network (LAN) actively searches for new VoIP phones. Upon determining a new phone, the central server system queries the switch element closest to the phone for the identity of the switch element. The central server system then determines the approximate location of the phone based on the location of the switch element. Unfortunately, such a solution requires the central server system to have visibility into the network and the ability to query switch elements. In addition, such a solution places an added processing burden on the central server system beyond its regular call processing responsibilities.

SUMMARY OF THE INVENTION

An embodiment of the invention solves the above problems and other problems by providing systems, methods, and software for determining the location of an emergency call based on the identity of an access system. In an embodiment of the invention, a communication system comprising an access system, a first end device of a plurality of end devices, and a call processing system. The access system is configured to provide the plurality of end devices with access to a packet communication network. The first end device of the plurality of end devices configured to transmit a first query to the access system, receive a first response indicating a first identifier for the access system, transmit a registration message indicating the first identifier and a second identifier for the first end device, and transmit a first call request for a call wherein the first call request indicates the second identifier. The call processing system in communication with the first end device and configured to receive the registration message, store the first identifier in association with the second identifier, receive the first call request, process the second identifier to determine the first identifier stored in association with the second identifier, and transmit a second call request indicating the first identifier.

In an embodiment of the invention, a location determining system is configured to receive the second call request and process the first identifier to determine a location for the call.

In an embodiment of the invention, the location determining system is further configured to generate a key for the call, transmit a second response to the call processing system indicating the key and a public safety answering point, and transfer the location to the public safety answering point.

In an embodiment of the invention, the call processing system is configured to transfer the key to the public safety answering point.

In an embodiment of the invention, the public safety answering point is configured to transfer a second query to the location determining system indicating the key and receive a third response from the location determining system indicating the location responsive to the second query.

In an embodiment of the invention, the end device comprises a session initiation protocol (SIP) phone.

In an embodiment of the invention, the call processing system comprises a SIP proxy server.

BRIEF DESCRIPTION OF THE DRAWINGS

The same reference number represents the same element on all drawings.

DETAILED DESCRIPTION OF THE PREFERRED EMBODIMENT

FIGS. 1-8 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

FIGS. 1-3

Figure 1:
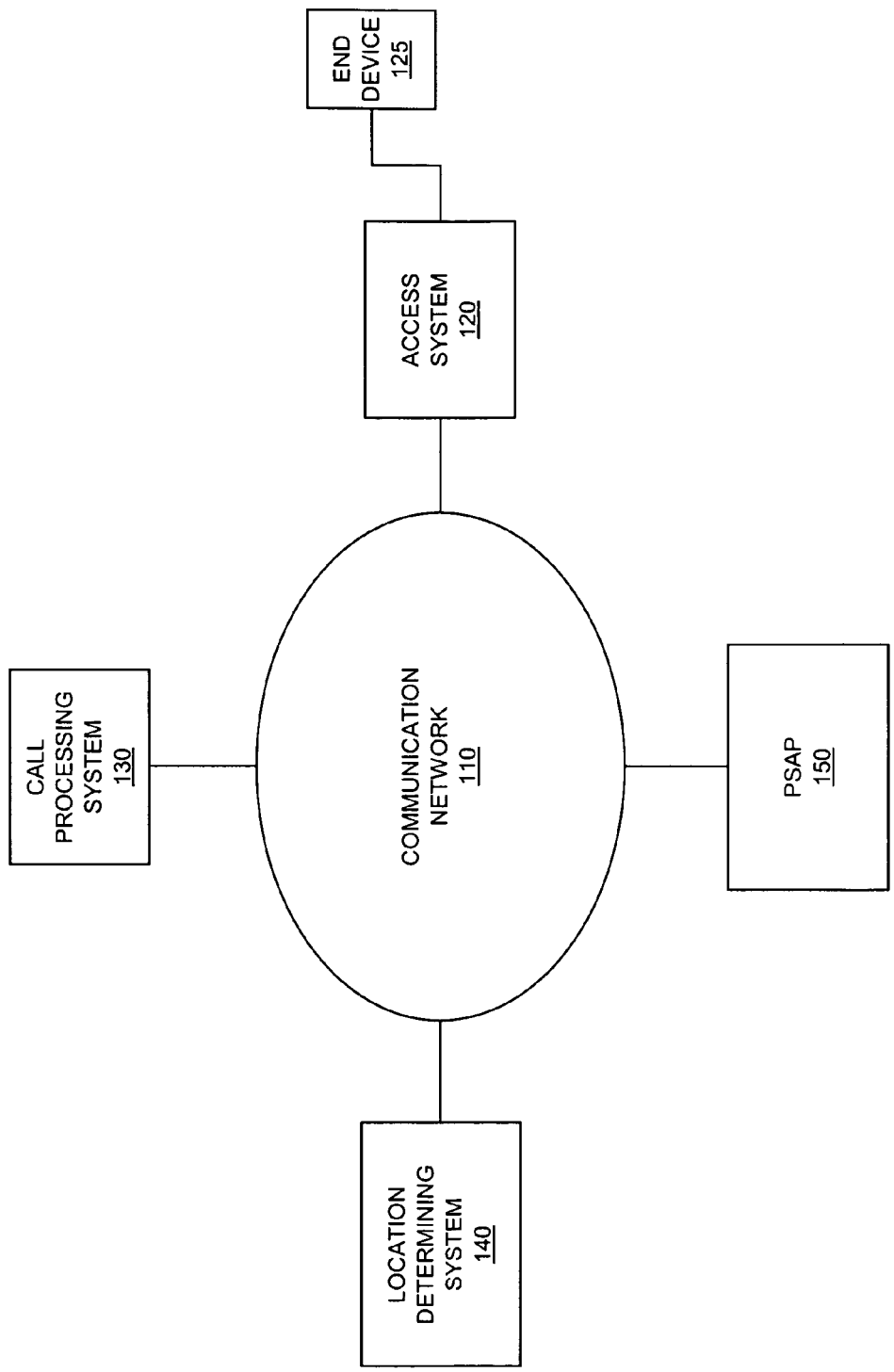
FIG. 1 illustrates a communication network in an embodiment of the invention.
Figure 2:
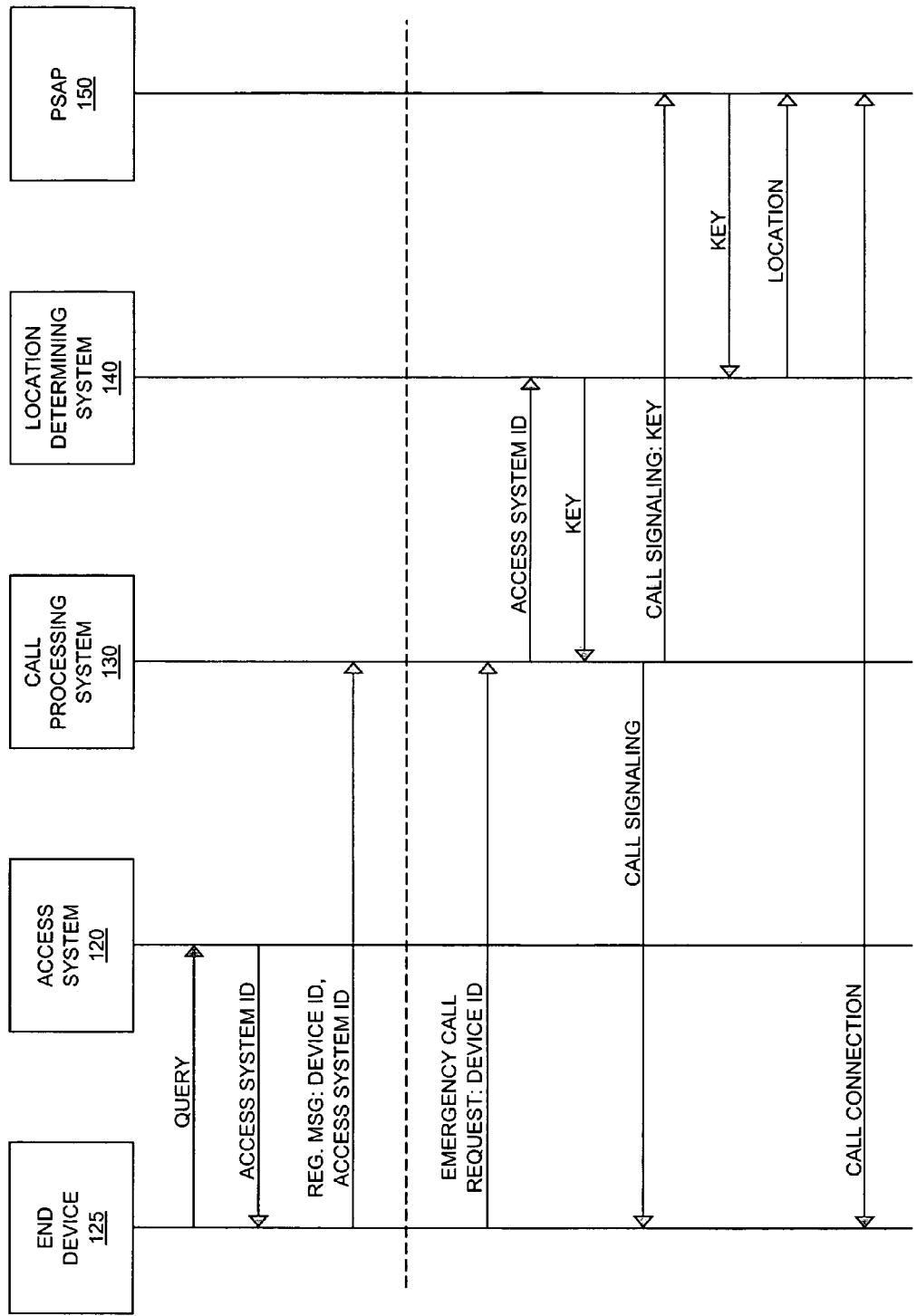
FIG. 2 illustrates a call flow diagram in an embodiment of the invention.
Figure 3:
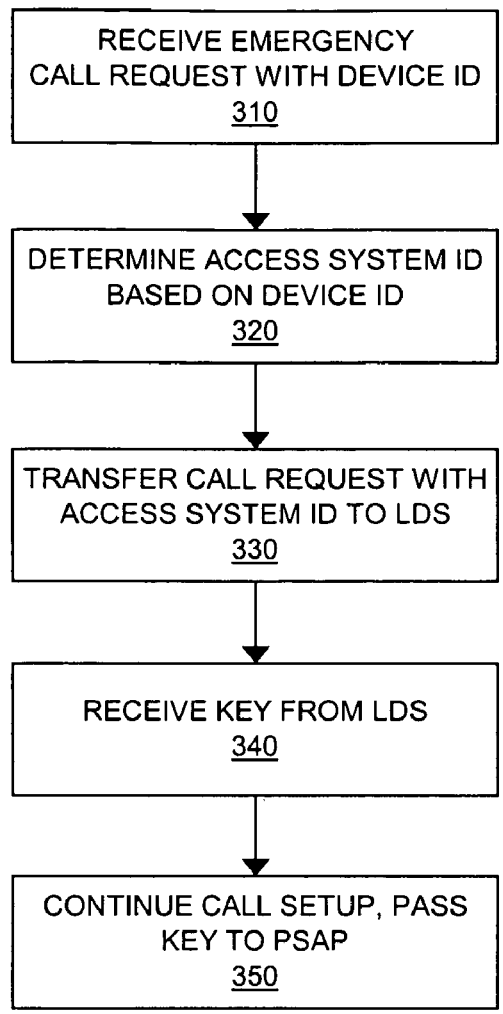
FIG. 3 illustrates a process in an embodiment of the invention.

FIGS. 1-3 illustrate embodiments of the invention whereby emergency service call handling capabilities for packet call services are improved by determining the location of a caller based on the identity of the access system used to provide the caller with access to a packet communication network. In particular, the end device used by the caller to make an emergency service call actively queries the access system for the identity of the access system. The end device then notifies a call processing system of the identity of the access system. The call processing system stores the identity of the access system in association with an identity for the end device.

Upon initiation of the emergency call, the call processing system determines the identity of the access system based on the identity of the end device or caller. The access system identity is then passed to a location determining system (LDS) for location resolution. The LDS determines the location of the caller and generates a key to identify the specific emergency call. The key is passed during the call setup process to an appropriate public service answering point (PSAP). The PSAP then queries the LDS with the key and he LDS responds with the proper location of the caller. The PSAP is then able to dispatch emergency responders to the call location.

Turning to FIG. 1, communication network 100 is illustrated in an embodiment of the invention. Communication network 100 includes communication network 110, access system 120, end device 125, call processing system (CPS) 130, location determining system (LDS) 140, and public service answering point (PSAP) 150. Communication network 110 could be any network or collection of networks. For instance, communication network 110 could include a packet network, a non-packet network, or a combination of packet and non-packet networks. Communication network 110 operatively couples access system 120, CPS 130, LDS 140, and PSAP 150 in a manner well known in the art.

In an embodiment of the invention, end device 125 could comprise any system capable of originating or terminating emergency calls. For example, end device 125 could be a mobile hand set, such as a mobile phone, personal digital assistance, or the like. CPS 130 could be any system capable of communicating with end device 125 and LDS 140 to handle emergency calls. Similarly, LDS 140 could be any system or collection of systems capable of communicating with CPS 130 and PSAP 150 to setup and handle emergency calls. It should be understood that PSAP 150 could comprise any system or collection of systems and are well known to those skilled in the art.

FIG. 2 illustrates a call flow diagram describing an emergency call sequence in an embodiment of the invention. In operation, end device 125 initiates an authentication process with access system 120 to gain access to communication network 110. During the authentication process, end device 125 transfers a query to access system 120 requesting an identifier (ID) for access system 120. Access system 120 responds with a message indicating an access system ID.

Next, end device 125 initiates a registration process with CPS 130 to obtain services, such as a packet-voice service. During the registration process, end device 125 transfers a registration message indicating the access system ID and identifying end device 125. End device 125 could be identified by a device ID, a calling number, or user ID, as well as by other types of identifiers linked to end device 125.

At anytime after the authentication and registration processes have completed, the user could encounter a situation requiring an emergency service call using end device 125. End device 125 responsively transfers an emergency call request to CPS 130. The emergency call request indicates the device ID, user ID, calling number or other such identifier. CPS 130 receives the emergency call request and responsively processes the indicated ID to determine the access system ID associated with the indicated ID. In this case, the access system ID is the ID for access system 120.

Upon determining the access system ID, CPS 130 transfers a call request message to LDS 140 indicating the ID for access system 120. LDS 140 generates a key for the ongoing emergency call and returns the key to CPS 130. CPS 130 commences with a well known emergency call setup process, including transmitting call signaling to end device 125 including call instructions for the emergency call. CPS 130 also transmits call signaling for PSAP 150 indicating the key for the call. PSAP 150 receives the incoming signaling for the call, including the key. PSAP 150 transfers a query indicating the key to LDS 140. LDS 140 responds with the location of access system 120. A bearer connection is eventually established between end device 125 and a termination system or work station at PSAP 150. Upon receiving the location information from LDS 140, an agent or system at PSAP 150 can direct emergency responders to the location of the emergency call.

FIG. 3 illustrates the operation of CPS 130 with respect to the call flow. To begin, CPS 130 receives the emergency call request from device 125 (Step 310). As discussed, the call request includes the identifier that identifies the device, caller, or both. CPS 130 looks up the associated access system ID based on the received identifier (Step 320). CPS 130 generates and transfers a new call request message to LDS 140 including the access system ID (Step 330). Next, CPS 130 receives the return response from LDS 140 indicating the key for the call (Step 340). Lastly, CPS 130 continues the call setup process, including passing the call key to PSAP 150 (Step 350).

As described, communication network 100 advantageously provides for improved emergency call service handling by determining the location of a caller based on the identity of the access system used to provide the caller with access to a packet communication network. In particular, end device 125 discovers the identity of an access system and provides the identity to CPS 130 for later use. In the event of an emergency call, CPS 130 looks-up the identity of the access system based on the identity of end device 125 or the identity of the user. CPS 130 provides the access system identification information to LDS 140, which in turn determines specific location information. Using well known call setup procedures, the emergency call is terminated to an appropriate PSAP 150. PSAP 150 accesses LDS 140 for the location information and responsively directs emergency personnel to the call location.

Second Embodiment Configuration and Operation

FIGS. 4-7

FIGS. 4-7 illustrate embodiments of the invention whereby emergency service call handling capabilities for packet call services are improved by determining the location of callers attempting to reach an emergency service utilizing the identity of the access system providing the user access to a packet communication network.

In an embodiment, access system identifications are pre-provisioned by a service provider and provided to a location determining system to be stored in association with the associated access system location information. When a user places an emergency phone call, the hand set used by the user transmits the identification of the access system through which the handset gains access to the service provider. The handset discovers the identification of the access system during an earlier authentication process. The service provider provides the access system identity to the location determining system, which in turn provides the associated location information to the appropriate public service answering point.

Figure 4:
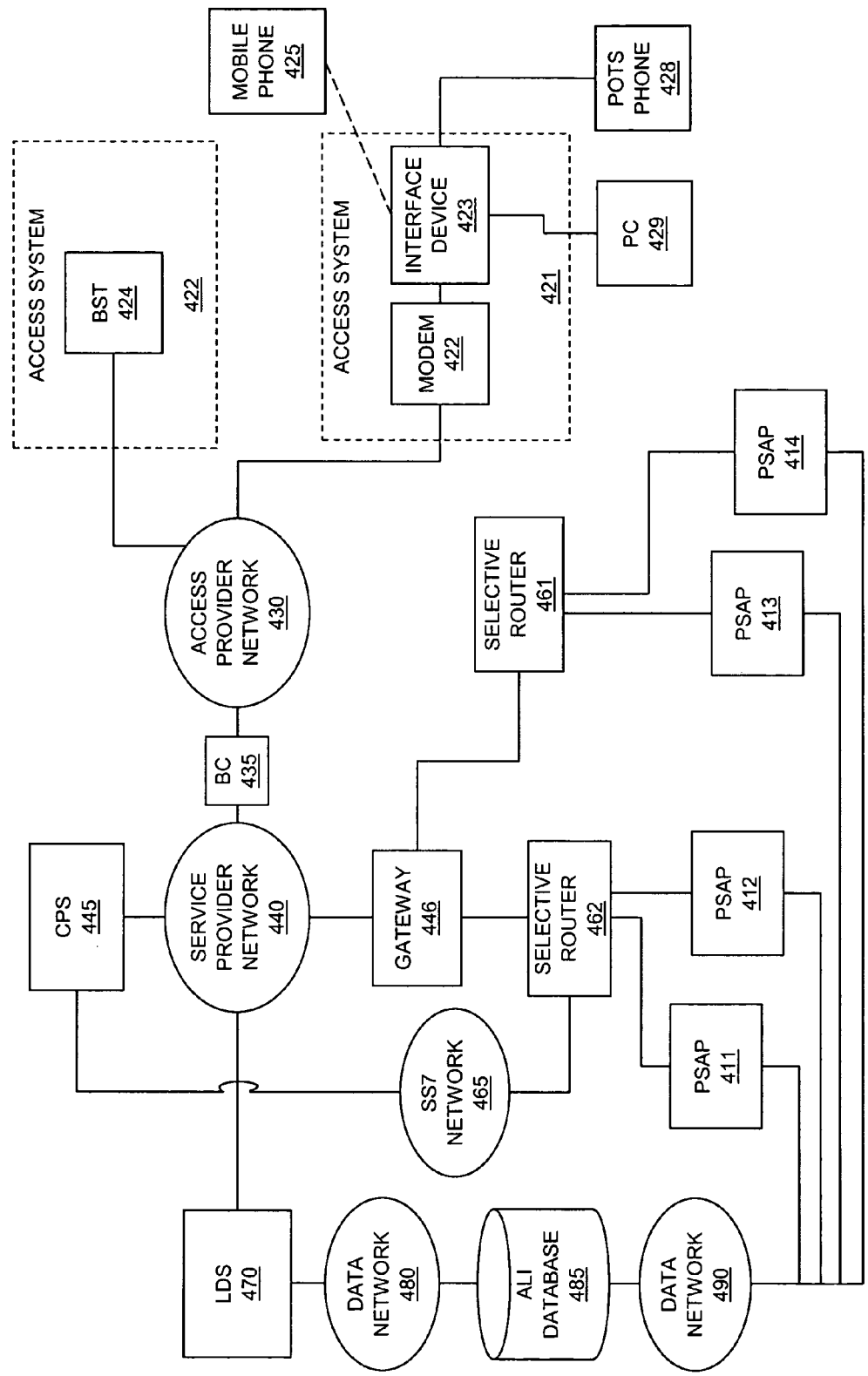
FIG. 4 illustrates a communication network in an embodiment of the invention.

Turning to FIG. 4, communication network 400 is illustrated in an embodiment of the invention. Communication network 400 includes service provider network 440 and access provider network 430. Border controller 435 resides between service provider network 400 and access provider network 430 and controls the exchange of communications between each network 430 and 440. Service provider network 440 could be any network or collection of networks capable of providing services, such as packet voice service, to end users. Access network 430 could be any network or collection of networks capable of providing end users with access to service provider network 440. In one example, access network 430 could comprise a cable multi-service operator network. In another example, access network 430 is an Internet service provider network.

Continuing with FIG. 4, communication network 400 includes access system 422 and access system 421. Access system 422 includes base station transceiver 424 in communication with access provider network 430 to provide mobile phone 426 with access to services provided by service provider network 440. Likewise, access system 421 includes modem 422 and interface device 423. Modem 422 also provides personal computer (PC) 429, plain old telephone service (POTS) phone 428, and modem 426 with access to services provided by service provider network 440. Interface device 423 provides an interfacing function to convert several communication formats to a format appropriate for modem 422. For example, interface device 423 could be capable of transmitting and receiving asynchronous communications to and from mobile phone 426 and PC 429, and synchronous communications to and from POTS phone 428.

Communication network 400 further includes call processing system (CPS) 445. In operation, call processing system 445 provides call control capabilities for voice over packet service calls initiated by mobile phone 426, as well as other end devices capable of packet voice service. CPS 445 could comprise a single network element or a collection of network elements. CPS 445 is capable of communicating with end devices to control service sessions. CPS 445 is also capable of communicating with intermediate devices, such as gateway 446 and SS7 network 465, to control service sessions that terminate to gateway 446.

Communication network 445 also includes location determining system (LDS) 470. LDS 470 is capable of providing caller location information to ALI database 485 for emergency calls. LDS 470 communicates with ALI database 485 over data network 480. In addition, LDS 470 is capable of communicating with CPS 445 during the emergency call provisioning process. ALI database 485 is capable of communicating with PSAPS 411, 412, 413, and 414 over data network 490 to provide the PSAPS with caller location information. Data networks 480 and 490 could be any data network well known to those in the art. PSAPS 411, 412, 413, and 414 are operatively coupled to selective routers 461 and 462.

Figure 5:
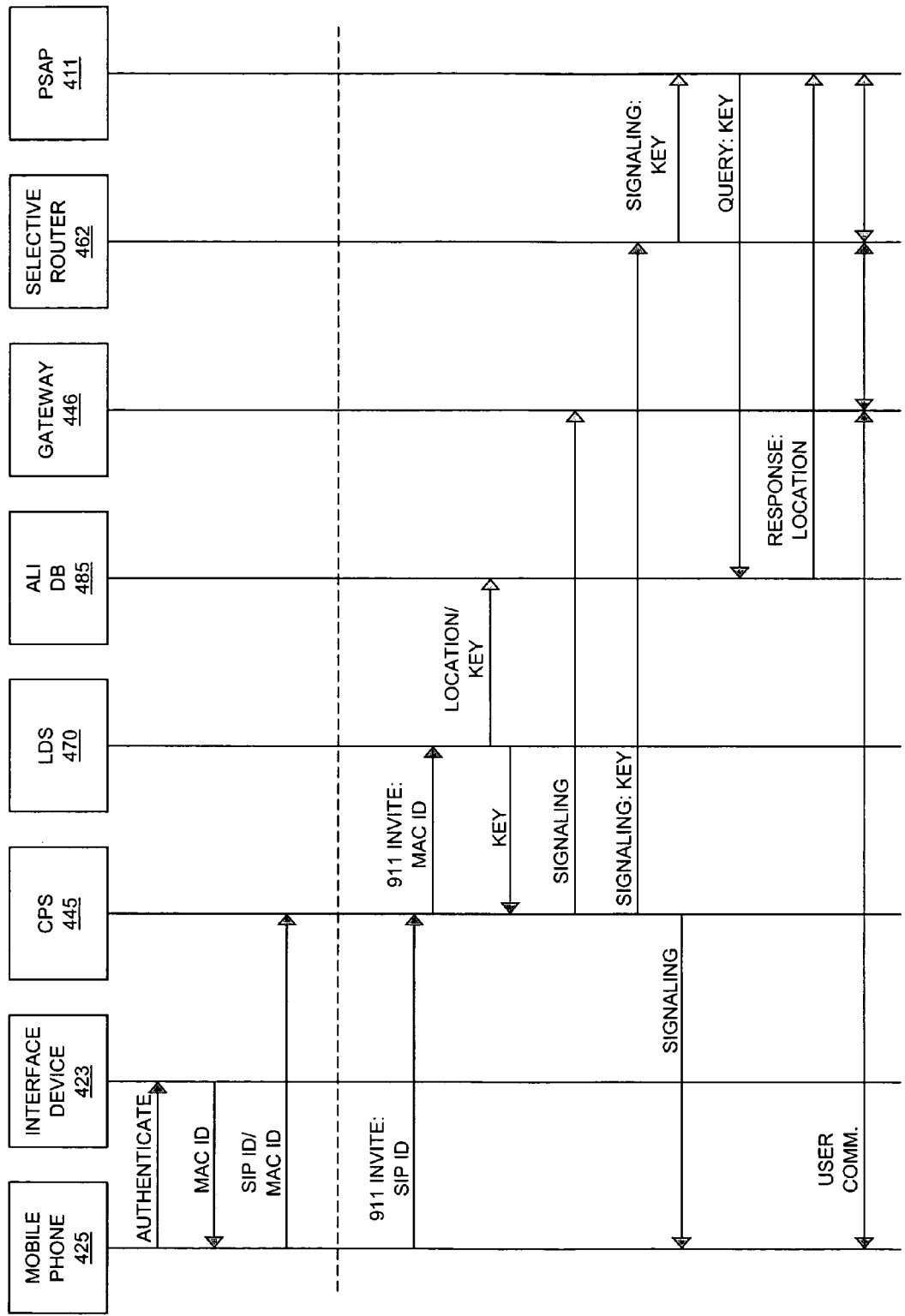
FIG. 5 illustrates a call flow diagram in an embodiment of the invention.

FIG. 5 illustrates a call flow diagram describing the operation of communication network 400 in an embodiment of the invention for providing improved emergency service call handling capabilities.

In this embodiment, interface device 423 first stores a unique number known to LDS 470. LDS 470 is pre-provisioned with the unique number and the location of interface device 423 at or near the time of service provisioning to an end user, enterprise, or other such customer. In this embodiment, access system 421 is a residential access system. The location information could comprise address information, global positioning system (GPS) information, or the like.

Further in this embodiment, mobile phone 524 could be a device capable of communicating wirelessly with interface device 423 using a wireless protocol, such as the 802.11b protocol, also known as WiFi. Other protocols are possible. Initially, mobile phone 425 executes an authentication process with interface device 423. During the authentication process, interface device 423 provides mobile phone 425 with a unique identifier. In one example, the identifier could be the media access control (MAC) identification number for interface device 423.

Upon completing the authentication process, mobile phone 425 initiates a registration process with CPS 445. In one example, mobile phone 425 includes a SIP client that interfaces with a SIP registration server on CPS 445. As part of the registration process, mobile phone 425 transfers a registration message to CPS 445 including the unique identifier for interface device 423. CPS 445 stores the identifier in association with another ID for either mobile phone 425 or the user, such as the MAC ID for mobile phone 425 or a user ID for the user. In an example, CPS 445 could store the identifiers in a database table.

Upon completing the registration process, the user is able to access a packet voice service using mobile phone 425. The packet voice service is provided by service provider network 440. An example of a packet voice service is Voice over Internet Protocol (VoIP).

At any point, the user could encounter a situation requiring a call for emergency services, such as 911 services. Upon a user prompting a 911 call, the SIP client running on mobile phone 425 generates a SIP invite message. The SIP invite message indicates either the phone ID, a user ID or both, along with an emergency services identifier. For example, the SIP invite message could indicate the SIP ID of the user in the form of userID@domainname.com. Optionally, the SIP invite message could include the MAC ID. Mobile phone 425 transmits the SIP invite message to a SIP server process running on CPS 445. The SIP server process could be, for example, a SIP proxy server, a SIP B2BUA (SIP Back 2 Back User Agent), and a SIP Application Server, as well as other types of application server platforms.

CPS 445 receives the SIP invite and recognizes that the call is a call for emergency services. CPS 445 responsively determines the access system ID stored in association with either the user or device ID. In one example, CPS 445 performs a database lookup to determine the access system identifier. In this embodiment, CPS 445 generates and transmits another SIP invite message to LDS 470. The second SIP invite message indicates the unique identifier for interface device 423. CPS 445 transmits the SIP invite message to LDS 470.

Upon receiving the SIP invite message, LDS 470 initiates a process to determine the location of the call. In one example, LDS 470 looks up the location of interface device 423 based on the unique identifier included in the SIP invite message. LDS 470 also determines the appropriate PSAP of PSAPs 411, 412, 413, and 414 for the emergency call. LDS 470 generates a key for the call and returns a response to CPS 445 indicating the key and the selected PSAP. In this embodiment, it is assumed that PSAP 411 is selected. LDS 470 also transmits a message to ALI database 485 indicating both the key and the location information.

CPS 445 receives and processes the response from LDS 470 to select one of selective routers 461 and 462 for the call. In this embodiment, it is assumed that selective router 462 is selected. CPS 445 transmits call signaling to SS7 network 465 for selective router 462. The call signaling indicates the emergency call and the key. Other information could be included in the call signaling, such as the trunk or line for the call from gateway 446. The call setup process to PSAP 411 is well known.

Upon receiving the call signaling, selective router 462 transmits further call signaling to PSAP 411, including the key. PSAP 411 transmits a query over data network 490 to ALI database 485. The query indicates the key. ALI database 485 processes the query to determine the location information stored in association with the key. Upon determining the location information, ALI database 485 generates and transmits a response over data network 490 to PSAP 411 indicating the location information. A bearer connection is established between PSAP 411 and mobile phone 514 through selective router 462 and gateway 446. Personnel at PSAP 411 can provide the location information to local emergency responders.

Figure 6:
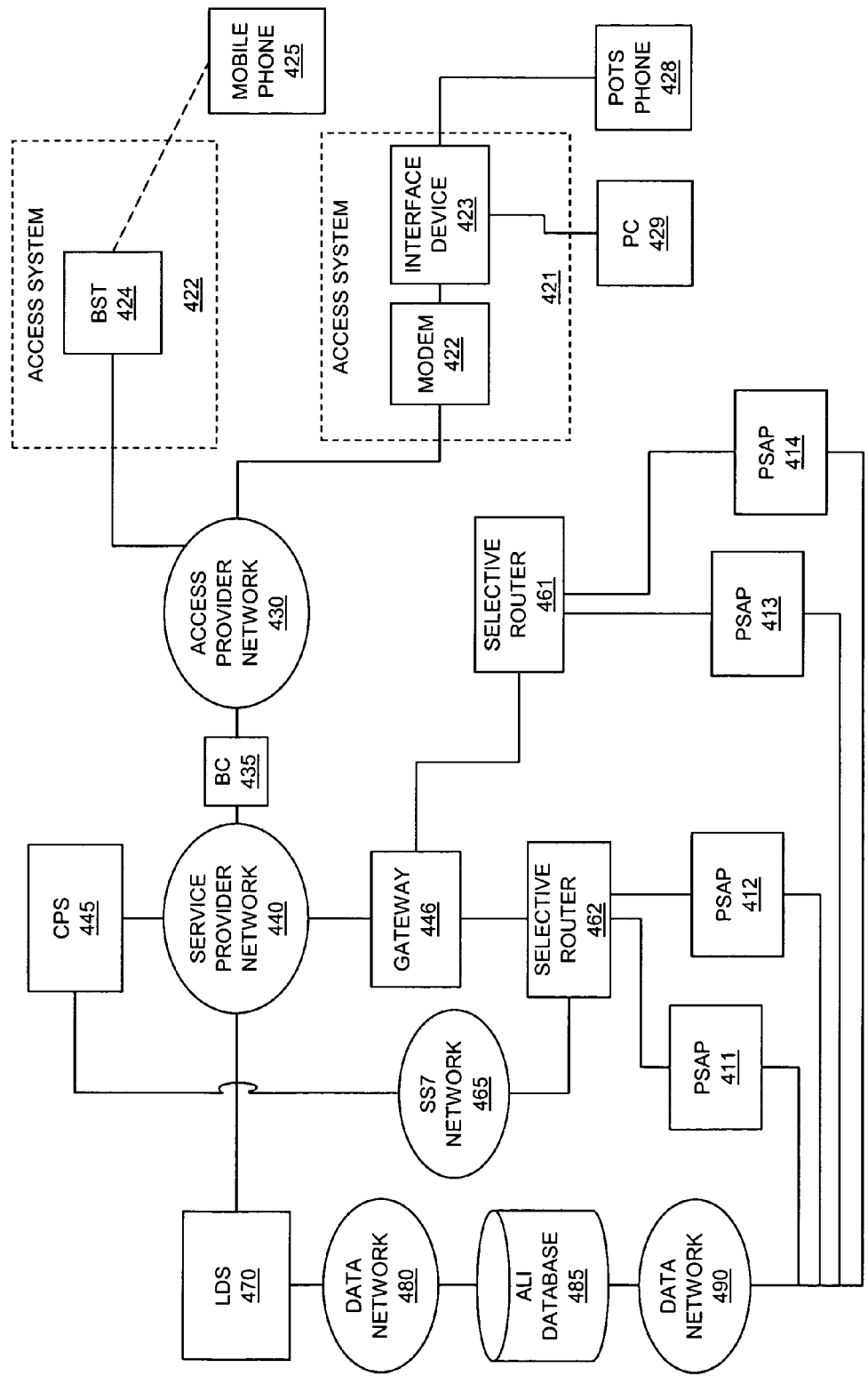
FIG. 6 illustrates a communication network in an embodiment of the invention.

FIG. 6 illustrates communication network 400 in an embodiment of the invention. In a distinction from FIG. 4, mobile phone 425 is in communication with BTS 424. BTS 424 could be, for example, an open access wireless base station located on a public premise. BTS 424 could be provisioned with a unique identifier that is known to LDS 470. The unique identifier could be, for example, a MAC ID.

Figure 7:
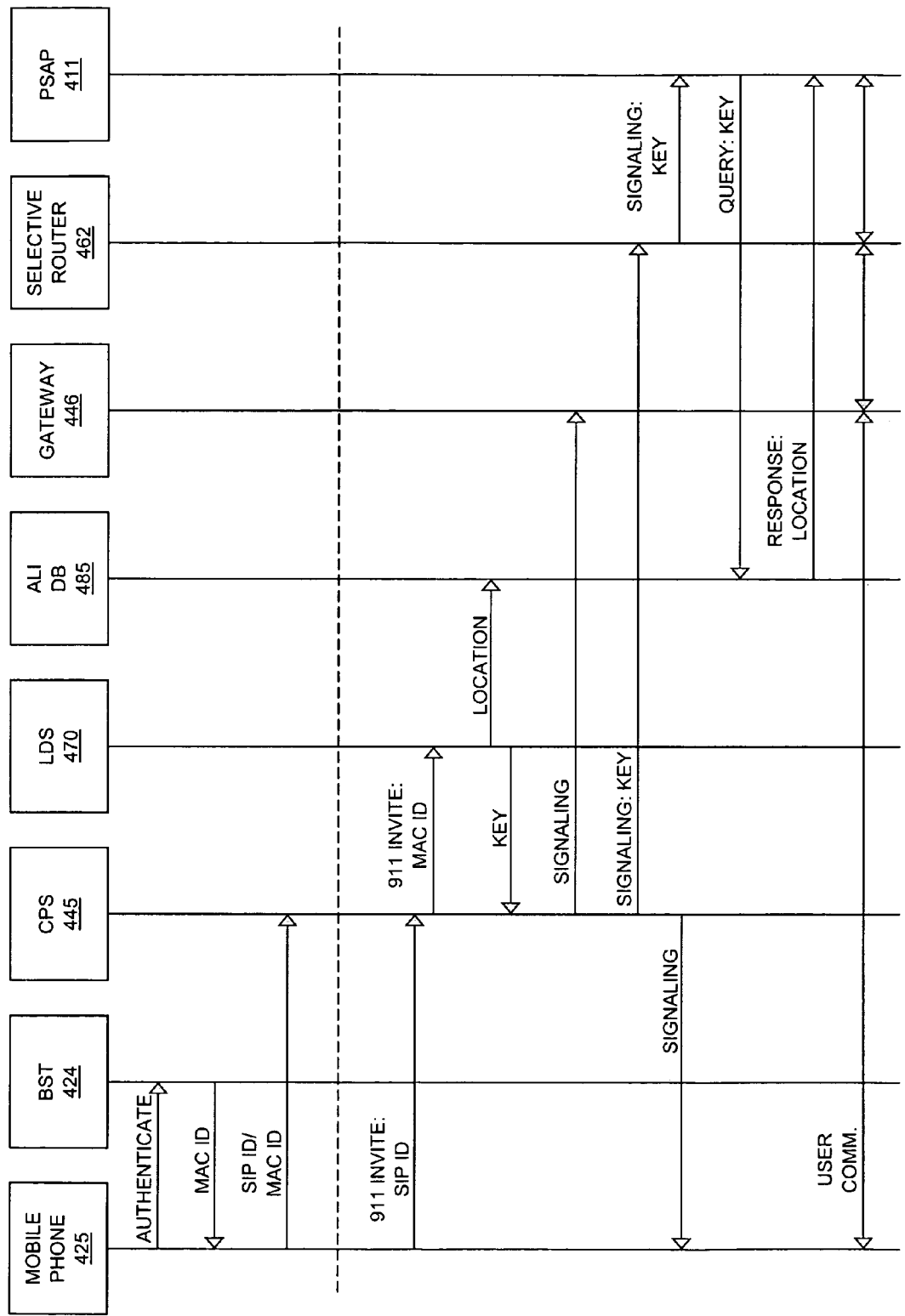
FIG. 7 illustrates a call flow diagram in an embodiment of the invention.

FIG. 7 illustrates the operation of communication network 400 in an embodiment of the invention with respect to FIG. 6. As illustrated, mobile phone 425 executes an authentication process with BTS 424. During the authentication process, BTS 424 provides its unique identifier to mobile phone 425. After the authentication process, mobile phone 425 executes a registration process with CPS 445. As part of the registration process, mobile phone 425 provides the unique identifier for BTS to CPS 445, along with its own unique identifier. Its own unique identifier could be provided in the form of a device ID, as well as in the form of a user ID or session ID.

At any point, the user of mobile phone 425 could require emergency services and could dial 911 to obtain the services. In response to the user input, mobile phone 425 transmits an invite message to CPS 445 indicating its own unique identifier. CPS 445 receives the processes the message to determine the access system associated with the call. To do so, CPS 445 looks up the BTS unique identifier based on the device or user ID. CPS 445 transmits the determined access system identifier to LDS 470 as part of another invite message. LDS 470 responds with a key and a selected PSAP. In this case, the selected PSAP is PSAP 414. LDS 470 looks up location information for the call based on the access system identifier. LDS 470 passes the location information and the key to ALI database 485. ALI database 485 stores the location information in association with the key.

Upon receiving the invite response from LDS 470, CPS 445 communicates with SS7 network 465 and mobile phone 425 to setup a call connection between mobile phone 425 and PSAP 414, including establishing connections to and from gateway 446 and selective router 461. The call signaling transferred from CPS 445 to SS7 network 446 includes the key generated by LDS 470. The key is passed via signaling to selective router 461. The key is passed via either signaling or in-band signals to PSAP 414. PSAP 414 queries ALI database 485 with the key to obtain the location information for the call. Once PSAP 414 has obtained the location information, personnel can direct emergency responders to the call location.

As advantageously illustrated by FIGS. 4-7, emergency service call handling capabilities for packet call services are improved by determining the location of callers attempting to reach an emergency service utilizing the identity of the access system providing the user access to a packet communication network.

Computer System

Figure 8:
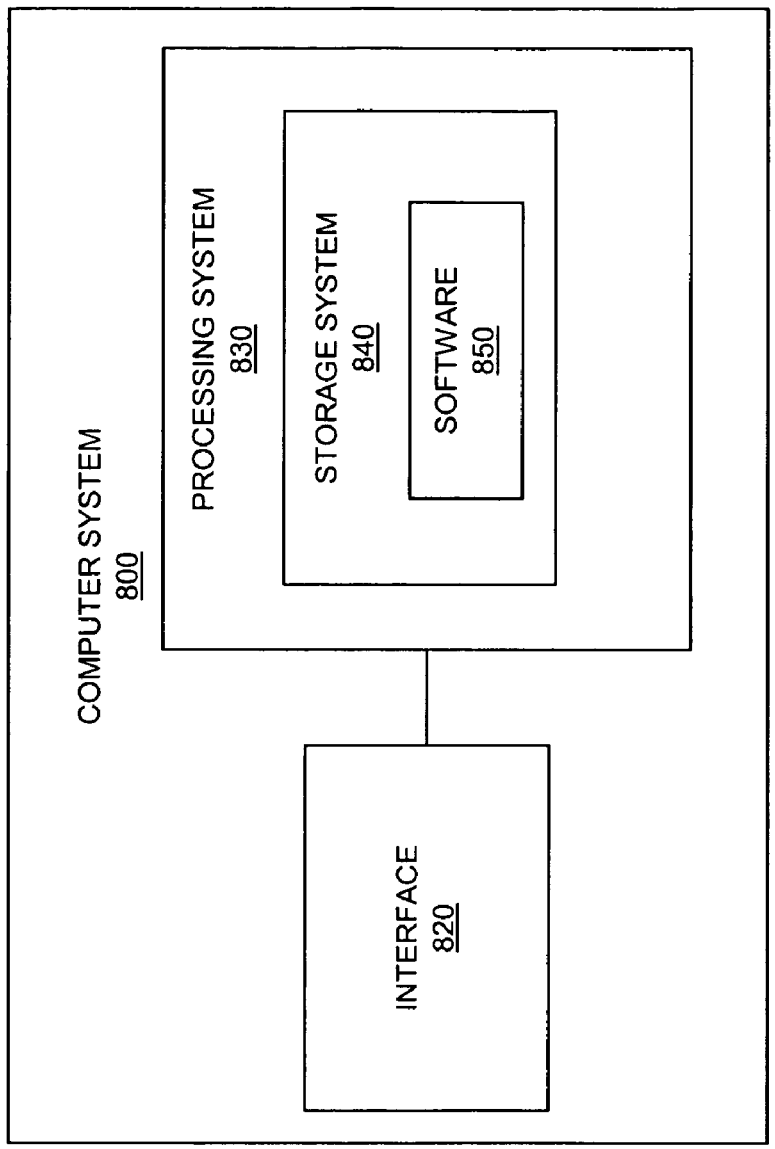
FIG. 8 illustrates a computer system in an embodiment of the invention.

FIG. 8 illustrates computer system 800 in an embodiment of the invention. Computer system 800 includes interface 820, processing system 830, storage system 840, and software 850. Storage system 840 stores software 850. Processing system 830 is linked to interface 820. Computer system 800 could be comprised of a programmed general-purpose computer, although those skilled in the art will appreciate that programmable or special purpose circuitry and equipment may be used. Computer system 800 may use a client server architecture where operations are distributed among a server system and client devices that together comprise elements 820-850.

Interface 820 could comprise a network interface card, modem, port, or some other communication device. Signaling interface 820 may be distributed among multiple communication devices. Interface 830 could comprise a computer microprocessor, logic circuit, or some other processing device. Processing system 830 may be distributed among multiple processing devices. Storage system 840 could comprise a disk, tape, integrated circuit, server, or some other memory device. Storage system 840 may be distributed among multiple memory devices.

Processing system 830 retrieves and executes software 850 from storage system 840. Software 850 may comprise an operating system, utilities, drivers, networking software, and other software typically loaded onto a general-purpose computer. Software 850 could also comprise an application program, firmware, or some other form of machine-readable processing instructions. When executed by the processing system 830, software 850 directs processing system 830 to operate as described for communication networks 100 and 400, and in particular, for call processing systems 130 and 445.

What is claimed is:

1. A communication system for determining a location of a caller obtaining an emergency service comprising:

an access system configured to provide a plurality of end devices with access to a packet communication network;

a first end device of the plurality of end devices configured to transmit a first query to the access system, receive a first response indicating a first identifier for the access system, transmit a registration message indicating the first identifier and a second identifier for the first end device, and transmit a first call request for a call wherein the first call request indicates the second identifier; and a call processing system in communication with the first end device and configured to receive the registration message, store the first identifier in association with the second identifier, receive the first call request, process the second identifier to determine the first identifier stored in association with the second identifier, and transmit a second call request indicating the first identifier.

2. The communication system of claim 1 further comprising a location determining system configured to receive the second call request and process the first identifier to determine a location for the call.

3. The communication system of claim 2 wherein the location determining system is further configured to generate a key for the call, transmit a second response to the call processing system indicating the key and a public safety answering point, and transfer the location to the public safety answering point.

4. The communication system of claim 3 wherein the call processing system is configured to transfer the key to the public safety answering point.

5. The communication system of claim 4 wherein the public safety answering point is configured to transfer a second query to the location determining system indicating the key and receive a third response from the location determining system indicating the location responsive to the second query.

6. The communication system of claim 1 wherein the end device comprises a session initiation protocol (SIP) phone.

7. The communication system of claim 6 wherein the call processing system comprises a SIP proxy server.

8. A method of operating a communication system for determining a location of a caller obtaining an emergency service comprising:

an access system configured to provide a plurality of end devices with access to a packet communication network, a first end device of the plurality of end devices, and a call processing system in communication with the first end device, the method comprising:

in the first end device, transmitting a first query to the access system, receiving a first response from the access system indicating a first identifier for the access system, transmitting a registration message indicating the first identifier and a second identifier for the first end device, and transmitting a first call request for a call wherein the first call request indicates the second identifier; and in the call processing system receiving the registration message, storing the first identifier in association with the second identifier, receiving the first call request, processing the second identifier to determine the first identifier stored in association with the second identifier, and transmitting a second call request indicating the first identifier.

9. The method of claim 8 further comprising in a location determining system receiving the second call request and processing the first identifier to determine a location for the call.

10. The method of claim 9 further comprising in the location determining system generating a key for the call, transmitting a second response to the call processing system indicating the key and a public safety answering point, and transferring the location to the public safety answering point.

11. The method of claim 10 further comprising transferring the key from the call processing system to the public safety answering point.

12. The method of claim 11 further comprising transferring a second query from the public safety answering point to the location determining system indicating the key and receive a third response from the location determining system indicating the location responsive to the second query.

13. The method of claim 8 wherein the end device comprises a session initiation protocol (SIP) phone.

14. The method of claim 13 wherein the call processing system comprises a SIP proxy server.

15. A call processing system for determining a location of a caller obtaining an emergency service comprising:

an interface configured to receive a registration message from a first end device wherein the registration message indicates a first identifier and a second identifier wherein the first identifier identifies an access system configured to provide the first end device with access to a packet communication network wherein the first end device receives a response indicating the first identifier from the access system responsive to a query from the first end device and wherein the second identifier identifies the first end device, receive a first call request for a call wherein the first call request indicates the second identifier;

a processing system configured to store the first identifier in association with the second identifier, process the second identifier to determine the first identifier stored in association with the second identifier, and generate a second call request indicating the first identifier; and wherein the interface is further configured to transmit the second call request.

16. The call processing system of claim 15 wherein the interface is configured to transmit the second call request to a location determining system wherein the location determining system receives the second call request, processes the first identifier to determine a location for the call, generates a key for the call, transmit a second response to the call processing system indicating the key and a public safety answering point, and transfers the location to the public safety answering point.

17. The call processing system of claim 16 wherein the interface is configured to transfer the key to the public safety answering point.

18. The call processing system of claim 15 wherein the registration message comprises a session initiation protocol (SIP) registration message.

19. The call processing system of claim 18 wherein the first call request message comprises a first SIP invite message.

20. The call processing system of claim 19 wherein the second call request message comprises a second SIP invite message.

* * * * *